June 26, 1928.
B. BOYKIN, JR
1,674,851
BRAKE DRUM FOR BULL WHEELS AND THE LIKE
Filed Dec. 11, 1926
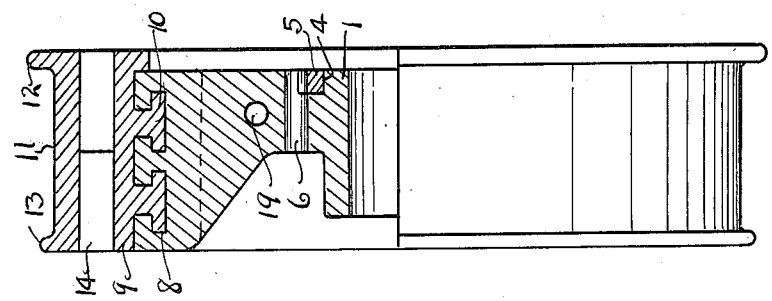
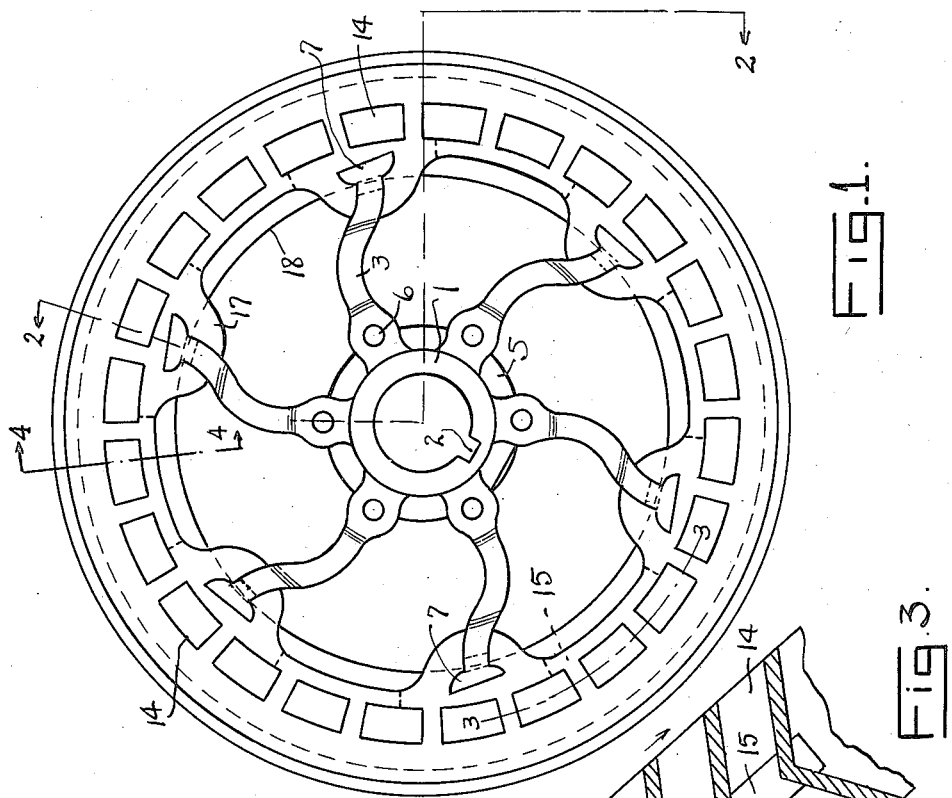
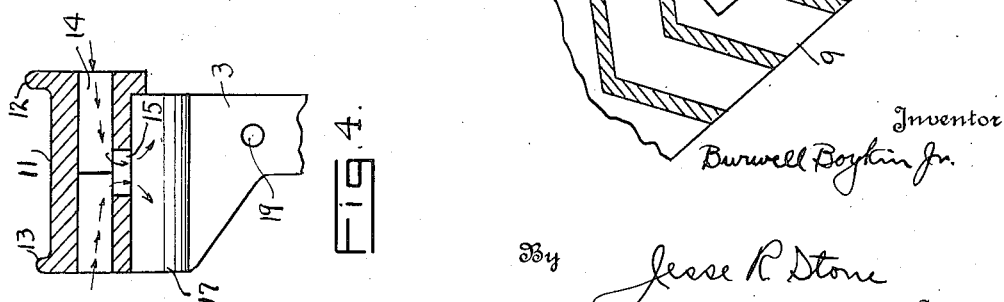
Inventor
Burwell Boykin Jr.
By Jesse R. Stone
Attorney Patented June 26, 1928.

1,674,851

UNITED STATES PATENT OFFICE.

BURWELL BOYKIN, JR., OF BEAUMONT, TEXAS.

BRAKE DRUM FOR BULL WHEELS AND THE LIKE.

Application filed December 11, 1926. Serial No. 154,281.

My invention relates to brake drums and more particularly to brake drums employed on hoisting apparatus, such as bull wheels on drilling rigs.

It is an object of the invention to provide a brake drum with effective air cooling structure thereon, which will serve to prevent overheating of the apparatus when in use.

It is also desired that the rim structure of the brake drum be secured to the supporting spokes in a particularly effective manner, the structure of which will be economical to manufacture.

I aim to provide a brake drum, the spokes of which are of particularly strong construction, and to cast a rim of steel thereon which is formed to withstand the severe usage and temperature to which it is subjected.

Referring to the drawings herewith, Fig. 1 illustrates a side elevation of a brake drum employing my invention thereon. Fig. 2 is a side view partly in elevation and partly in section on the line 2—2 of Fig. 1. Fig. 3 is a sectional view approximately on the line 3—3 of Fig. 1. Fig. 4 is a transverse section on the line 4—4 of Fig. 1. Like numerals of reference are employed to designate like parts in all the views.

My brake drum includes a central hub 1 which is adapted to be keyed to the shaft of the hoisting drum. It has a keyway 2 therein for this purpose. Said hub has a plurality of spokes 3 radiating therefrom, said spokes being curved between their ends to allow a slight compression of the rim of the drum relative to the hub without injury. Said spokes 3 are preferably cast integral with the hub and I contemplate forming them of chrome nickel steel or some other similar quality of steel capable of withstanding heavy strains without fracture. The inner side of the hub 1 is formed with an annular recess 4 therein, to receive a ring 5, which may be driven therein, serving to reinforce the structure. The spokes are further formed with transverse opening 6 therethrough for cooling purposes.

The ends 7 of the spokes, as shown, in Fig. 1, are extended laterally to form a tenon to interfit with the rim of the drum, the enlarged end 7 is also provided with morticed grooves 8, shown in Fig. 2, extending circumferentially around the drum. I have shown two of these morticed grooves, and it is contemplated that the rim 9 of the drum will be cast of a somewhat softer material, such as semi-steel, with tenons 10 projecting within said grooves 8 in the ends of the spokes, and thus firmly anchor the rim on the spokes, so that they may not be moved relative to each other but will be held rigidly together.

The rim 9 of the drum has an outer cylindrical surface 11 for the application of the brake band, there being radiating flanges 12 and 13 on the marginal edges of the cylindrical surface.

For the purpose of cooling the drum when it tends to become heated under the friction of the brake band, I provide openings 14 forming passages longitudinally through the rim, and said openings extend from the longitudinal center of the rim diagonally forward in the direction of rotation of the drum when the hoisting mechanism is being unreeled and the brake applied. There is also connected with this series of longitudinal openings, passages, indicated at 15, in the rim extending from the inner edge of the rim radially outward into said openings 14. This allows a circulation of the air from the outside of the rim to the center and inwardly toward the hub, as shown in Fig. 4. This serves very effectively to cool the drum during operation. The particular formation of these air passages is regarded as of material value in cooling.

It will be noted that the rim has inwardly projecting lugs 17 on each side of the spokes to reinforce the attachment of the spokes to the rim. There is also a central web 18 extending around the inner circumference of the rim serving to reinforce the same. There may also be transverse openings 19 through the spokes for the purpose of cooling in operation.

The advantages of the construction here shown and described lie particularly in the fact that the rim and the central spider including the hub and the spokes can be both cast of material of the desired composition and the resulting structure will be particularly adapted to withstand the usage to which it is subjected. The spokes will withstand strains due to heating or cooling of the rim without danger of breaking, and the rim will be cooled by the circulation of air therethrough, as set out in a most effective manner.

Having thus described my invention, what I claim as new and desired to protect by Letters Patent is:

1. A brake drum comprising a hub, curved spokes radiating from said hub, the ends of said spokes having morticed grooves therein, and a rim of steel of different composition from said spokes cast to interfit with the morticed ends of said spokes.

2. A brake drum including a hub, spokes on said hub, the outer ends of which are enlarged and formed with circumferential morticed grooves therein, and a rim cast upon the outer ends of said spokes and interfitting within said morticed grooves.

3. A brake drum, a hub and spokes thereon, said hub and spokes being cast integrally of hard steel, and a rim cast upon the ends of said spokes, said rim being of a softer quality of steel than said spokes and hub, and interlocking with said spokes.

4. A brake drum comprising a hub and spokes thereon, said spokes having their outer ends enlarged, a plurality of radial tenons on said enlarged ends, and a rim attached upon the ends of said spokes and interfitting with said ends and said tenons to form a rigid connection therewith.

In testimony whereof I hereunto affix my signature this 6th day of December, A. D. 1926.

BURWELL BOYKIN, Jr.